(12) United States Patent
Bruhn et al.

(10) Patent No.: US 12,071,918 B2
(45) Date of Patent: Aug. 27, 2024

(54) TANK ASSEMBLY

(71) Applicant: Bayerische Motoren Werke Aktiengesellschaft, Munich (DE)

(72) Inventors: Andreas Bruhn, Puchheim (DE); Lorenz Ehgartner, Ebersberg (DE); Marco Landwehr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 588 days.

(21) Appl. No.: 17/288,278

(22) PCT Filed: Sep. 20, 2019

(86) PCT No.: PCT/EP2019/075285
§ 371 (c)(1),
(2) Date: Apr. 23, 2021

(87) PCT Pub. No.: WO2020/083581
PCT Pub. Date: Apr. 30, 2020

(65) Prior Publication Data
US 2021/0388746 A1   Dec. 16, 2021

(30) Foreign Application Priority Data

Oct. 26, 2018   (DE) .................... 10 2018 126 774.6

(51) Int. Cl.
*F02M 37/00* (2006.01)
*F02M 37/02* (2006.01)
(Continued)

(52) U.S. Cl.
CPC ............ *F02M 37/18* (2013.01); *F02M 37/00* (2013.01); *F02M 37/02* (2013.01); *F02M 37/10* (2013.01); *F01N 2610/02* (2013.01)

(58) Field of Classification Search
CPC ...... F01N 3/2066; F01N 9/00; F01N 2240/16; F01N 2610/02; F01N 2610/10;
(Continued)

(56) References Cited

U.S. PATENT DOCUMENTS 8,316,885 B2 * 11/2012 Bauer ....................... F23K 5/04
123/514
8,627,799 B2 * 1/2014 Johnson ............... F02M 31/186
123/301
(Continued)

FOREIGN PATENT DOCUMENTS

DE   10 2007 061 808 A1   6/2009
DE   10 2009 011 018 A1   9/2010
(Continued)

OTHER PUBLICATIONS

Machine Translation JP 2011-122562 (Year: 2023).*
(Continued)

*Primary Examiner* — Dapinder Singh
(74) *Attorney, Agent, or Firm* — Crowell & Moring LLP

(57) ABSTRACT

A tank arrangement includes a tank container which encloses a tank space where the tank container has a bottom side and a top side which is disposed opposite from the bottom side. A swirl pot is disposed in the tank space and has a swirl pot opening. A suction jet pump has a nozzle, a propulsion jet line, and a suction jet line where the propulsion jet line and the suction jet line open into the nozzle and where the nozzle has an outlet opening. The nozzle is disposed on the top side of the tank container at a distance above the swirl pot opening with the outlet opening directed toward the swirl pot opening.

15 Claims, 1 Drawing Sheet

(51) Int. Cl.
*F02M 37/10* (2006.01)
*F02M 37/18* (2006.01)

(58) Field of Classification Search
CPC .... F01N 2610/1406; F01N 2610/1486; F02M 25/0221; F02M 25/0222; F02M 25/025; F02M 37/00; F02M 37/0088; F02M 37/02; F02M 37/025; F02M 37/10; F02M 37/18; Y02T 10/12; Y02T 10/40; Y02A 50/20
See application file for complete search history.

(56) References Cited

U.S. PATENT DOCUMENTS

| | | | |
|---|---|---|---|
| 9,315,391 B2 * | 4/2016 | Gerhart | F01N 3/2066 |
| 10,005,020 B2 * | 6/2018 | Langh | F01N 3/18 |
| 2009/0249766 A1 | 10/2009 | Leonard | |
| 2019/0234321 A1 * | 8/2019 | Hamad | F02M 27/02 |

FOREIGN PATENT DOCUMENTS

| | | |
|---|---|---|
| DE | 10 2014 223 826 A1 | 5/2016 |
| DE | 10 2015 204 647 A1 | 9/2016 |
| EP | 3 324 030 A1 | 5/2018 |
| JP | 2000-356174 A | 12/2000 |
| JP | 2011-122562 A | 6/2011 |
| KR | 20-0417811 Y1 | 6/2006 |

OTHER PUBLICATIONS

PCT/EP2019/075285, International Search Report dated Dec. 4, 2019 (Two (2) pages).

German Search Report issued in German application No. 10 2018 126 774.6 dated Aug. 16, 2019, with Statement of Relevancy (Ten (10) pages).

* cited by examiner

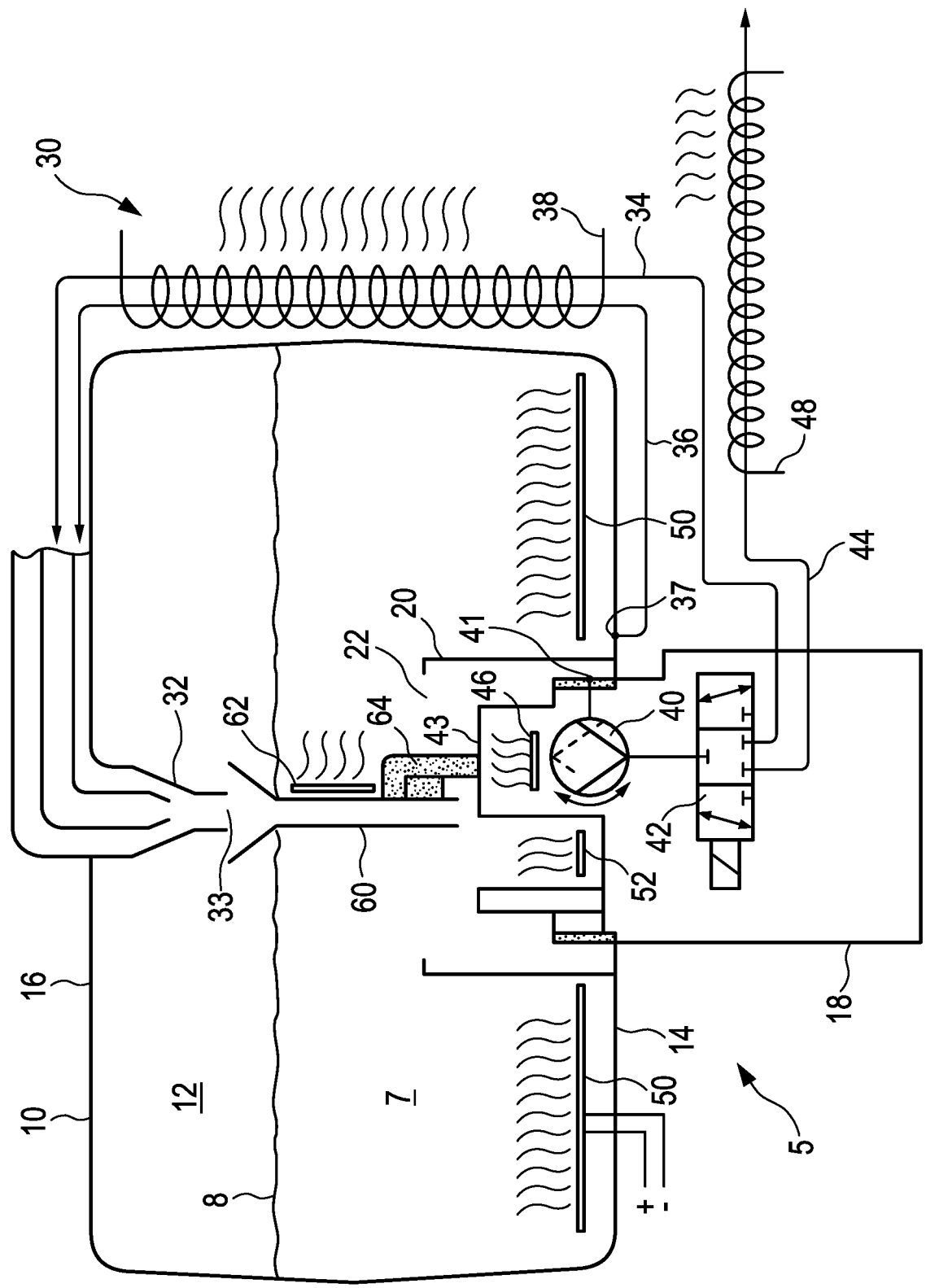

TANK ASSEMBLY

BACKGROUND AND SUMMARY OF THE INVENTION

The invention relates to a tank arrangement. Such a tank arrangement typically has a tank container, which encloses a tank space.

Such tank arrangements may be used for example for a liquid such as an aqueous solution or water. Aqueous solutions may for example be urea solutions, which are used in motor vehicles for reducing particular constituent parts in the exhaust gas. Water may be used for example for actively reducing the combustion chamber temperature.

It has been established that, with tank arrangements for aqueous solutions, a problem typically exists if the tank arrangement is used at temperatures at which the aqueous solution or the water freezes. This can occur at a temperature as high as 0° C. or a slightly lower temperature, that is to say at temperatures which, for example in Central Europe in winter, are frequently reached and fallen below.

It is therefore known, for example, to provide a heating means in a tank arrangement. It is also known to provide a pump module for extracting the liquid and surrounding baffle walls for ensuring the supply in the case of a low fill level. Here, however, it has now been established that such heating means and baffle walls get in the way of one another and prevent sloshing movements and liquid convection, which would be fundamentally helpful for the thawing of a contained liquid.

It is furthermore known to actively fill regions within baffle walls that, for example, can form swirl pots. However, pumps used for this purpose until now have proven to be not resistant to ice pressure. Consequently, for thawing a frozen solution, only the aforementioned heating means remains, the latter having to thaw the entire solution as far as the pump, or a suction connection assigned to the pump, before extraction can be realized. In known embodiments, it is not possible for the thawing process to be assisted.

It is therefore an object of the invention to provide a tank arrangement which, in comparison with known embodiments, is designed differently, for example exhibits improved thawing behavior.

The solution provided herein relates to a tank arrangement.

The tank arrangement has a tank container, which encloses a tank space. The tank arrangement may store for example an aqueous solution or another liquid. The tank container has a bottom side and a top side, which is situated opposite the bottom side. In typical tank containers, such bottom sides and top sides can be recognized easily by a person skilled in the art, since, owing to the configuration of the tank container, the further components and the connections, the position in which the tank container is to be installed into a motor vehicle or another unit is clear. Here, the bottom side is that side which faces downward in a typical installation situation.

The tank arrangement has a swirl pot. The swirl pot is arranged in the tank space and has a swirl pot opening. The swirl pot can typically be filled via the swirl pot opening.

The tank arrangement has a suction jet pump. The suction jet pump has a nozzle, a propulsion jet line and a suction jet line. The propulsion jet line and the suction jet line open into the nozzle and the nozzle has an outlet opening. Typically, the nozzle is configured such that fluid, typically a liquid, exiting the propulsion jet line and the suction jet line is discharged again by it via the outlet opening. Here, the propulsion jet line typically generates a negative pressure which leads to fluid being sucked in via the suction jet line. The principle of such suction jet pumps is known per se. Such a suction jet pump is relatively inexpensive and failure-resistant and requires relatively little space.

The nozzle is arranged on the top side of the tank container at a distance above the swirl pot opening and with the outlet opening directed toward the swirl pot opening.

By way of the described arrangement of the nozzle, it is achieved that a liquid level in the tank container or tank space can be kept below the nozzle or the outlet opening, with the result that freezing of the nozzle or of the outlet opening can be prevented. This allows installation of a nozzle which is not resistant to ice pressure. Moreover, the nozzle can be used even if not all of the liquid contained in the tank space has yet been thawed. Consequently, the thawing process can be assisted.

Outside the swirl pot opening, the swirl pot is preferably sealed off. This means in particular that the swirl pot is open exclusively at the swirl pot opening and is otherwise completely enclosed. Consequently, liquid entering the swirl pot opening can be held in the swirl pot. It should be understood that deliberate extraction from the swirl pot, for example by a pump, is not to be understood here as constituting an interruption of the sealing. A swirl pot is therefore also sealed off outside the swirl pot opening if, for example, a line for extracting liquid from the swirl pot leads to the outside.

The swirl pot is preferably seated on the bottom side. In this way, liquid can be collected in the swirl pot at the bottom side of the tank arrangement, wherein the highest possible space is available for the swirl pot and components situated above the latter.

The tank arrangement preferably has a pump. The pump is preferably connected to the propulsion jet line for generating a propulsion jet. This may be realized for example directly or via a valve still to be described further below. The pump is preferably configured to suck in tank contents of the tank space. Via the pump, it is thus possible for tank contents to be removed from the tank space and used for generating the propulsion jet. In this way, it is then possible for example for other liquid to also be sucked in at the same time via the suction jet.

The pump is preferably arranged in the swirl pot. In this way, the pump can benefit from the fact that, even in the case of a low fill level, liquid is most likely still sufficiently available in the swirl pot.

The tank arrangement preferably has a switching valve and an extraction line. Here, the extraction line may serve in particular for extracting liquid stored in the tank space in order to supply it for an intended use, such as for example injection into a combustion chamber. The switching valve is preferably configured here to connect the pump in a switchable manner to the propulsion jet line or to the extraction line. The pump can thereby be used both for the generation of a propulsion jet and for the extraction of liquid from the tank space.

According to a possible configuration, the tank arrangement has a first valve, a second valve and an extraction line. Here, the first valve is configured to connect the pump in a switchable manner to the propulsion jet line. The second valve is configured to connect the pump in a switchable manner to the extraction line. In this way, by contrast to the switching valve, it is also possible for liquid to be simultaneously conducted from the pump into the propulsion jet line and into the extraction line. Simultaneous extraction of liquid and operation of the suction jet pump is thus possible.

The pump preferably has a heating means. The heating means may be arranged for example in a pump housing or directly adjacently to a pump housing. The heating means serves for direct and targeted heating of the pump.

The suction jet line may be connected, at the bottom side of the tank container, to the tank space outside the swirl pot. In this way, liquid can be sucked in from outside the swirl pot, wherein, as a result of the arrangement at the bottom side, sucking-in is typically still possible even in the case of low fill levels. The sucked-in liquid can then be conducted from the suction jet pump into the swirl pot, whereby the latter can be filled actively.

The suction jet line may be arranged around the propulsion jet line, in particular in a coaxial manner. This results in a simple and compact design.

The tank arrangement advantageously has a heating means in the tank space adjacent to the swirl pot and/or has a heating means in the swirl pot. It is thus possible to directly heat liquid in the swirl pot or adjacent to the swirl pot. For example, the swirl pot can be heated in a targeted manner in order to thaw liquid contained therein.

The tank arrangement preferably has a heating means of the propulsion jet line. It is thus possible for the propulsion jet line to be heated in a targeted manner.

The tank arrangement preferably has a heating means of the suction jet line. It is thus possible for the suction jet line to be heated in a targeted manner.

It should be understood that heating means for the propulsion jet line and suction jet line may also be formed together or as a unit, for example if the two lines are situated adjacently to one another or, as has been stated further above, are arranged so as to be coaxial with one another.

The tank arrangement preferably has a supply line in the tank space between the nozzle and the swirl pot. The supply line is preferably configured here to direct into the swirl pot opening liquid exiting from the outlet opening of the nozzle. In this way, particularly good filling action of the nozzle for the swirl pot can be achieved since the supply line typically ensures that the greatest part or all of the liquid exiting the nozzle is indeed guided into the swirl pot opening and thus enters into the swirl pot. The supply line may for example be in the form of a pipe, in particular in the form of a pipe which is vertical in the state of installation. The supply line may in particular be of funnel-shaped form at its upper end. This can improve the receiving of liquid from the outlet opening of the nozzle.

The supply line preferably has a heating means. Consequently, the supply line can be thawed separately.

Preferably, the propulsion jet line and/or the suction jet line are/is led outside the tank space between the bottom side and the top side of the tank container. Consequently, the lines can be heated separately and do not occupy any structural space within the tank container.

Further features and advantages will be taken by a person skilled in the art from the exemplary embodiment described below with reference to the appended drawing.

BRIEF DESCRIPTION OF THE DRAWING

FIG. 1 shows a tank arrangement.

DETAILED DESCRIPTION OF THE DRAWING

FIG. 1 shows a tank arrangement 5 according to an exemplary embodiment of the invention.

The tank arrangement 5 has a tank container 10. The tank container encloses a tank space 12. Stored in the tank space 12 is a liquid 7 which fills the tank space 12 as far as a liquid surface 8. Air is situated in the tank space 12 above the liquid surface 8.

The tank container 10 has a bottom side 14 and a top side 16. Here, the top side 16 is situated opposite the bottom side 14. This means in particular that, in a typical state of installation, the tank container 10 is installed with a bottom side 14 facing downward. This can relate for example to the normal position of a motor vehicle on a road.

At the bottom of the tank container 10, there is arranged an extraction unit 18, on which some of the components to be described below are arranged.

A swirl pot 20 is formed in the tank container 10. The swirl pot has a swirl pot opening 22 at the top side. Excluding the swirl pot opening 22 and connections to be described below, the swirl pot 20 is sealed. Consequently, liquid which passes into the swirl pot 20 through the swirl pot opening 22 can typically pass out of the swirl pot 20 only through the connections to be described below. As shown, the swirl pot 20 is seated directly on the bottom side 14 of the tank container 10.

The tank arrangement 5 furthermore has a suction jet pump 30. The suction jet pump 30 has a nozzle 32 with an outlet opening 33. The suction jet pump 30 has a propulsion jet line 34 and a suction jet line 36.

The propulsion jet line 34 and the suction jet line 36 both open into the nozzle 32, with the result that, owing to a propulsion jet introduced into the nozzle 32 from the propulsion jet line 34, a negative pressure is formed in the nozzle 32. As a result of the negative pressure, a suction jet is generated in the suction jet line 36, wherein, for this purpose, the suction jet line 36 is connected to the tank space 12 at a connection point 37. Here, the connection point 37 is situated on the bottom side 14 outside the swirl pot 20, with the result that liquid 7 situated outside the swirl pot 20 can be sucked in by the suction jet line 36 even in the case of a low fill level.

The nozzle 32 is constructed in such a way that any liquid which enters through the propulsion jet line 34 and the suction jet line 36 exits again through the outlet opening 33.

The tank arrangement 5 furthermore has a pump 40. The pump is arranged in the swirl pot 20 and has a pump connection 41 for sucking in, wherein the pump connection 41 ends in the swirl pot 20. The pump 40 can consequently suck liquid from the swirl pot 20. The pump 40 is surrounded by a pump housing 43.

The tank arrangement 5 furthermore has a switching valve 42, which is arranged in the extraction unit 18. The switching valve 42 is connected at the inlet side to the pump 40. The switching valve can thus receive and pass on liquid sucked from the swirl pot 20 by the pump 40.

The tank arrangement 5 furthermore has an extraction line 44. The extraction line serves for extracting liquid in order to supply it for an intended use.

At the outlet side, the switching valve 42 is connected both to the propulsion jet line 34 and to the extraction line 44. Consequently, it is firstly possible, with a corresponding switching position, for the switching valve 42 to ensure that the pump 40 generates a propulsion jet in the propulsion jet line 34 for the suction jet pump 30, which leads to normal operation of the suction jet pump 30. In other words, in this operating mode, liquid 7 is sucked from the swirl pot 20 by the pump 40 and is conducted via the switching valve 42 into the propulsion jet line 34. This leads to the generation of a suction jet which sucks in additional liquid 7 via the suction jet line 36.

If the switching valve 42 is, by contrast, switched such that the liquid 7 delivered by the pump 40 passes into the extraction line 44, then it is possible in this manner for liquid 7 to be extracted and to be supplied for an intended use, such as for example injection into a combustion chamber, or for a use in a unit for exhaust gas aftertreatment.

It should be understood that, as an alternative to the illustrated embodiment, it is also possible for example for both the propulsion jet line 34 and the extraction line 44 to be connected to the pump 40 via an in each case separate valve.

As can be seen in FIG. 1, the nozzle 32 is arranged directly above the swirl pot opening 22. Here, the outlet opening 33 of the nozzle 32 is directed downward and points directly toward the swirl pot opening 22. The suction jet pump 30 can thus be used for active filling of the swirl pot 20. In other words, by means of the aforementioned propulsion jet, a suction jet can be generated in the suction jet line 36, which suction jet sucks in additional liquid 7 at the intake point 37 and conveys it via the nozzle 32 into the swirl pot 20. This can ensure a supply even in the case of low fill levels of the liquid 7 in the tank container 10.

A supply line 60 is arranged below the nozzle 32. The supply line is formed in such a way that liquid exiting from the outlet opening 33 of the nozzle 32 passes directly into the supply line 60 and is conducted in a targeted manner by the latter into the swirl pot 20. This improves the filling of the swirl pot 20, since a situation in which liquid, in the case of relatively steep downward-sloping sections, is moved from the nozzle 32 laterally to such an extent that it no longer passes into the swirl pot 20 is avoided. As shown, the supply line 60 is of funnel-shaped form at the top side, with the result that the receiving of liquid exiting from the outlet opening 33 is improved.

In the present case, the supply line 60 is fastened to the pump housing 43 by means of a holder 64. In this way, the supply line 60 is reliably held in position.

A heating means 50 is arranged in the tank space 12 outside the swirl pot 20. The heating means serves for electrically heating the liquid 7 such that the latter can, for example, be thawed if it is frozen. A heating means 52 is also arranged within the swirl pot 20.

The pump 40 likewise has a heating means 46, by way of which the pump 40 can be heated in a specific manner. The heating means 46 is arranged within the pump housing 43. The extraction line 44 has a heating means 48 by way of which the extraction line 44 can be heated in a specific manner. The supply line 60, too, has a heating means 62, by way of which the supply line 60 can be heated in a specific manner.

In the present case, the propulsion jet line 34 and the suction jet line 36 are led predominantly outside the tank container 10. There, they are led in a coaxial manner such that the suction jet line 36 surrounds the propulsion jet line 34. This also corresponds to the configuration of the opening of both lines 34, 36 into the nozzle 32.

The propulsion jet line 34 and the suction jet line 36 have, outside the tank container 10, a heating means 38 which serves for specific heating of these two lines 34, 36.

It should be understood that, instead of the illustrated electrical heating means 38, 46, 48, 50, 52, 62, use may also be made of other designs, for example heating devices based on the passage of warm liquid.

By way of the embodiment described, it is possible for freezing of the nozzle 32 to be prevented even in the case of a relatively high fill level of the liquid 7 in the tank space 12, since the liquid surface 8 can be kept below the outlet opening 33 of the nozzle 32 without this leading to a significant restriction on usability. This avoids damage to the nozzle 32 due to frost. Moreover, the pump 40 may also be emptied by targeted recirculation, whereby it becomes free of ice pressure.

Baffle walls additional to the swirl pot 20 may advantageously be dispensed with in the embodiment described here. This facilitates sloshing movements of the liquid 7, which assist thawing.

If the liquid 7, for example after a relatively long standstill time of a vehicle at cold temperatures, is completely frozen, then it is possible, for example, firstly through specific heating of the pump 40, the propulsion jet line 34, the suction jet line 36 and the supply line 60 by means of the in each case assigned heating means 46, 38, 62, for a channel from the swirl pot 20, via the suction jet pump 30 and through the supply line 60 to be opened up by thawing, with the result that a first liquid movement can be realized. This can significantly facilitate the thawing. In parallel with this, the heating means 50 outside the swirl pot 20 and the heating means 52 within the swirl pot 20 can assist thawing of the liquid 7. Through the possibility of forcing pumping of liquid 7 in the circuit along the channel opened up by thawing that has just been described, warm liquid is distributed relatively quickly and the thawing process is therefore realized significantly more quickly than in the case of embodiments known from the prior art.

What is claimed is:

1. A tank arrangement for storing a urea solution or water, comprising:
    a tank container which encloses a tank space, wherein the tank container has a bottom side and a top side which is disposed opposite from the bottom side, wherein the urea solution or the water is stored in the tank space of the tank container, and wherein the urea solution or the water fills the tank space up to a liquid surface of the urea solution or the water;
    a swirl pot, wherein the swirl pot is disposed in the urea solution or the water in the tank space and below the liquid surface and has a swirl pot opening; and
    a suction jet pump which has a nozzle, a propulsion jet line, and a suction jet line, wherein the propulsion jet line and the suction jet line open into the nozzle and wherein the nozzle has an outlet opening;
    wherein the nozzle is disposed above the liquid surface and above the top side of the tank container at a distance above the swirl pot opening with the outlet opening directed toward the swirl pot opening such that freezing of the nozzle is prevented.

2. The tank arrangement according to claim 1, wherein, outside the swirl pot opening, the swirl pot is sealed off.

3. The tank arrangement according to claim 1, wherein the swirl pot is seated on the bottom side.

4. The tank arrangement according to claim 1 further comprising a pump which is connected to the propulsion jet line for generating a propulsion jet.

5. The tank arrangement according to claim 4, wherein the pump is disposed in the swirl pot.

6. The tank arrangement according to claim 4 further comprising a switching valve and an extraction line, wherein the switching valve is configured to switchably connect the pump to the propulsion jet line or to the extraction line.

7. The tank arrangement according to claim 4 further comprising a first valve, a second valve, and an extraction line, wherein the first valve is configured to switchably connect the pump to the propulsion jet line and wherein the second valve is configured to switchably connect the pump to the extraction line.

8. The tank arrangement according to claim 4, wherein the pump has a heating device.

9. The tank arrangement according to claim 1, wherein the suction jet line is connected, at the bottom side of the tank container, to the tank space outside the swirl pot.

10. The tank arrangement according to claim 1, wherein the suction jet line is disposed around the propulsion jet line in a coaxial manner.

11. The tank arrangement according to claim 1 further comprising a heating device in the tank space adjacent to the swirl pot and/or a heating device in the swirl pot.

12. The tank arrangement according to claim 1 further comprising a heating device of the propulsion jet line and/or a heating device of the suction jet line and/or a heating device of an extraction line.

13. The tank arrangement according to claim 1 further comprising a supply line disposed in the tank space between the nozzle and the swirl pot, wherein the supply line is configured to direct into the swirl pot opening urea solution or water exiting from the outlet opening of the nozzle.

14. The tank arrangement according to claim 13, wherein the supply line has a heating device.

15. The tank arrangement according to claim 1, wherein the propulsion jet line and/or the suction jet line extends outside the tank space between the bottom side and the top side of the tank container.

\* \* \* \* \*